(12) United States Patent
Recker

(10) Patent No.: US 8,695,292 B2
(45) Date of Patent: Apr. 15, 2014

(54) VEHICLE GLAZING EDGE SEAL WITH EMBEDDED STIFFENER

(75) Inventor: Duane Recker, Auburn, IN (US)

(73) Assignee: Guardian Industries Corp., Auburn Hills, MI (US)

( * ) Notice: Subject to any disclaimer, the term of this patent is extended or adjusted under 35 U.S.C. 154(b) by 1249 days.

(21) Appl. No.: 10/900,404

(22) Filed: Jul. 28, 2004

(65) Prior Publication Data

US 2006/0032181 A1 Feb. 16, 2006

(51) Int. Cl.
*E06B 3/00* (2006.01)

(52) U.S. Cl.
USPC .............. 52/208; 52/204.591; 52/204.62; 52/204.69; 296/93

(58) Field of Classification Search
USPC ............ 52/208, 204.591, 204.62, 204.69; 296/93, 96.21, 146.15
See application file for complete search history.

(56) References Cited

U.S. PATENT DOCUMENTS

| | | | |
|---|---|---|---|
| 3,756,881 A | 9/1973 | Denman et al. | |
| 3,774,363 A * | 11/1973 | Kent | 156/71 |
| 4,458,459 A * | 7/1984 | Irrgang | 52/208 |
| 4,606,159 A | 8/1986 | Kunert | |
| 4,621,469 A * | 11/1986 | Kruschwitz | 52/208 |
| 4,681,794 A | 7/1987 | Kunert et al. | |
| 4,722,818 A | 2/1988 | Zoller | |
| 4,765,673 A | 8/1988 | Frabotta et al. | |
| 4,833,847 A | 5/1989 | Inayama et al. | |
| 4,876,132 A | 10/1989 | Kunert | |
| 4,916,873 A * | 4/1990 | Keys | 52/208 |
| 4,968,543 A * | 11/1990 | Fujioka et al. | 428/31 |
| 5,062,248 A | 11/1991 | Kunert | |
| 5,078,444 A * | 1/1992 | Shirahata et al. | 296/93 |
| 5,088,787 A * | 2/1992 | Gross | 296/93 |
| 5,095,669 A | 3/1992 | Kunert et al. | |
| 5,154,028 A | 10/1992 | Hill et al. | |
| 5,257,450 A * | 11/1993 | Tamura | 29/527.1 |
| 5,316,829 A | 5/1994 | Cordes et al. | |
| 5,382,401 A | 1/1995 | Pickett et al. | |
| 5,384,995 A | 1/1995 | Kunert et al. | |
| 5,443,299 A | 8/1995 | Yada et al. | |
| 5,443,673 A | 8/1995 | Fisher et al. | |
| 5,456,874 A | 10/1995 | Cordes et al. | |
| 5,519,979 A | 5/1996 | Kunert et al. | |
| 5,591,528 A | 1/1997 | Fisher et al. | |
| 5,603,546 A * | 2/1997 | Desir, Sr. | 296/93 |
| 5,624,148 A * | 4/1997 | Young et al. | 296/93 |
| 5,803,527 A * | 9/1998 | Fujiya | 296/93 |
| 6,287,402 B2 * | 9/2001 | Soldner | 156/71 |
| 6,382,696 B1 * | 5/2002 | Young | 296/93 |
| 6,487,823 B2 | 12/2002 | Lagrue | |
| 6,513,854 B2 | 2/2003 | Lagrue et al. | |
| 6,607,622 B2 | 8/2003 | Lagrue et al. | |

(Continued)

*Primary Examiner* — Robert Canfield
*Assistant Examiner* — Matthew Gitlin
(74) *Attorney, Agent, or Firm* — Nixon & Vanderhye P.C.

(57) ABSTRACT

A glazing edge seal is provided so as to include an embedded stiffener which is embedded in a polymer inclusive base portion of the edge seal. The embedded stiffener is flexible so as to allow the base portion of the edge seal to be easily formed to an appropriate shape, but is rigid enough to maintain that formed shape while adhesives sets and/or cures. In certain example embodiments, the bottom surface of the edge seal is provided with a cut-out portion or cavity for receiving an adhesive(s) between the glazing and a main body of the edge seal, thereby permitting the adhesive to be controlled within a defined area, and/or to a defined thickness, thereby simplifying manufacturing.

10 Claims, 2 Drawing Sheets

(56) References Cited

U.S. PATENT DOCUMENTS

| | | | |
|---|---|---|---|
| 6,769,700 B2 * | 8/2004 | Ortmuller et al. | 277/642 |
| 6,814,385 B2 * | 11/2004 | Fujiwara | 296/93 |
| 8,312,688 B2 * | 11/2012 | Bordeaux et al. | 52/716.5 |
| 2001/0003233 A1 * | 6/2001 | Mikkaichi et al. | 52/208 |

* cited by examiner

VEHICLE GLAZING EDGE SEAL WITH EMBEDDED STIFFENER

This application relates to a vehicle glazing edge seal. In certain example embodiments, the edge seal includes an embedded stiffener and/or a cut-out portion or cavity for receiving an adhesive(s) between the glazing and a main body of the edge seal. The edge seal may be used in conjunction with a vehicle windshield, backlite, sidelite or any other type of vehicle glazing.

BACKGROUND OF THE INVENTION

It is known to provide a glass substrate with a frame-like polymer profile proximate an edge portion thereof. For example, see U.S. Pat. No. 5,154,028, the disclosure of which is hereby incorporated herein by reference. Such profiles may act as a weather seal between the glazing and an adjacent vehicle window frame. In other instances, such profiles may be used as an intermediate body (or spacer) to which an adhesive bead is applied during the assembly of automotive windows, where the bead bonds the profile to a corresponding window frame of the vehicle. Such profiles often include a lip that may be used either for centering purposes (e.g., see U.S. Pat. No. 5,384,995, incorporated herein by reference), or alternatively as a weatherstrip (e.g., water seal) and/or gap covering unit.

FIG. 1 illustrates a known polymer profile frame (same as frame profile herein) bonded to a glass substrate in a vehicle window application, from U.S. Pat. No. 5,095,669 which is incorporated herein by reference. The window assembly of FIG. 1 includes: (a) glass substrate 1 including exterior surface 2, interior surface 4, and peripheral edge 6, (b) vehicle window frame 3 (e.g., of sheet metal) including attachment flange 5 and frame section 7, (c) profile 9 including lip 11 extending from base portion 13, and (d) adhesive 15 for bonding the glazing/substrate 1 to flange 5 of the window frame 3. Opaque baked enamel layer 17 and primer 19 are sequentially provided on the substrate 1 between the profile 9 and the substrate itself for bonding the profile to the glass substrate 1. Surface 2 of substrate 1 is the exterior window surface and is thus exposed to the ambient atmosphere outside the vehicle on which the window assembly is mounted.

FIG. 2 illustrates another known polymer profile frame bonded to a glass substrate around all sides thereof in a vehicle window application, from U.S. Pat. No. 5,384,995 which is incorporated herein by reference. The window assembly of FIG. 2 includes: (a) glass substrate 1 including exterior surface 2, interior surface 4, and peripheral edge 6, (b) vehicle window frame 3 including attachment flange 5 and frame section 7, (c) profile 9 including lip 11 extending from base portion 13, and (d) adhesive 15 mounted on the profile for bonding the glazing/substrate 1 to flange 5 of the window frame 3. Opaque baked enamel layer 17 is provided on the substrate 1 between the profile 9 and the substrate itself. Surface 2 of substrate 1 is the exterior window surface and is exposed to the ambient atmosphere outside the vehicle on which the window assembly is mounted.

U.S. Pat. No. 4,765,673 also discloses a type of glazing edge seal. In the '673 patent, in order to securely bond the edge seal to the glass substrate, the edge seal encapsulates the edge of the glass substrate (i.e., the edge seal is bonded to both major surfaces of the glass substrate, as well as the edge of the glass substrate).

Unfortunately, the aforesaid profiles of the '669, '995 and '673 patents are problematic in certain respects. In the '669 and '995 patents, the flat bottom surface of the profile is bonded to only one major surface of the glass substrate as shown in FIGS. 1 and 2 herein. This type of bonding system to the glass substrate tends to be weak, and sometimes results in the profile shifting positions in an undesirable manner during curing of adhesive. Moreover, the bump at the top of the base portion 13 in the profile of FIG. 1 herein sometimes tends to significantly deform in an undesirable manner during curing of the adhesive, thereby resulting in permanent deformation which can adversely affect water seals, spacing, and/or the like. Meanwhile, the encapsulating-type seal of the '673 patent is undesirable in that it is required to wrap around three surfaces of the glazing when viewed cross sectionally (higher expense, and burdensome manufacturing techniques are required), and also is aesthetically not particularly desirable.

In view of the above, it will be apparent to those skilled in the art that there exists a need for a glazing profile that may be bonded to only a single major surface of a vehicle glazing in an improved manner, and/or which may be capable of reducing undesirable deformation and/or movement prior to adhesive curing.

BRIEF SUMMARY OF THE INVENTION

There is provided a vehicle glazing edge seal. In certain example embodiments, the edge seal includes an embedded stiffener which is embedded in a polymer inclusive base portion of the edge seal. The embedded stiffener is flexible so as to allow the base portion of the edge seal to be easily formed to an appropriate shape, but is rigid enough to maintain that formed shape while adhesive sets and/or cures.

In certain example embodiments of this invention, the bottom surface of the edge seal is provided with a cut-out portion or cavity for receiving an adhesive(s) between the glazing and a main body of the edge seal. This adhesive retaining structure permits the adhesive to be controlled within a defined area, and to a defined thickness, thereby simplifying manufacture of the overall window structure of the vehicle.

In certain example embodiments of this invention, the edges seal is made of a common single material. In other example embodiments of this invention, the edge seal includes at least two portions that are bonded to one another yet are of different materials. In certain embodiments, the material of the main body or base portion of the seal is a polymer based material such as PVC, whereas the material for the flexible lip portion of the seal may be relatively soft and/or provided for anti-squeak purposes.

Edge seals according to certain example embodiments of this invention may be used in conjunction with a vehicle windshield, backlite, sidelite or any other type of vehicle glazing.

In certain example embodiments of this invention, there is provided a vehicle window assembly comprising: a substrate or glazing having an exterior surface and an interior surface; a polymer inclusive profile adhered to only the interior surface of the substrate or glazing via at least an adhesive, the polymer inclusive profile including a polymer inclusive base portion and an elongated flexible lip portion which extends from the base portion in a manner so as to contact a vehicle window frame; the profile including each of: (a) a substantially U-shaped and/or V-shaped metal inclusive stiffener embedded in the polymer inclusive base portion of the profile, and (b) an adhesive retaining cut-out or cavity defined in a bottom surface of the profile adjacent the interior surface of the substrate or glazing; and wherein at least a substantial portion of the adhesive for adhering the profile to the interior surface of the substrate or glazing is provided in the adhesive retaining cut-out or cavity defined in the bottom surface of the profile.

In other example embodiments of this invention, there is provided a vehicle window assembly comprising: a glass substrate; a polymer inclusive profile adhered to the glass substrate via at least an adhesive, the polymer inclusive profile including a polymer inclusive base portion and an elongated flexible lip portion which extends from the base portion in a manner so as to contact a vehicle window frame; and the profile including at least one of: (a) a stiffener embedded in the polymer inclusive base portion of the profile, and (b) an adhesive retaining cavity defined in a bottom surface of the profile adjacent the interior surface of the substrate.

DETAILED DESCRIPTION OF THE INVENTION

Figure 1:
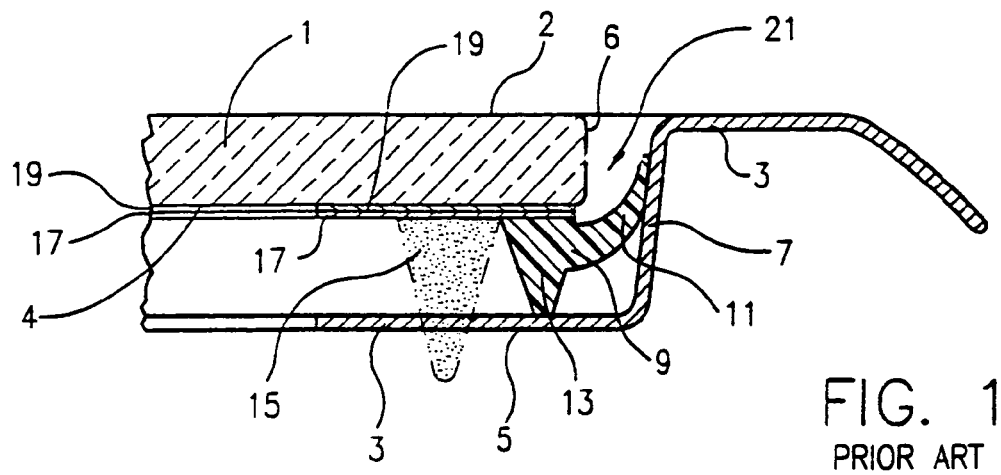
FIG. 1 is a cross sectional view of a prior art vehicle glazing assembly, including a frame profile.
Figure 2:
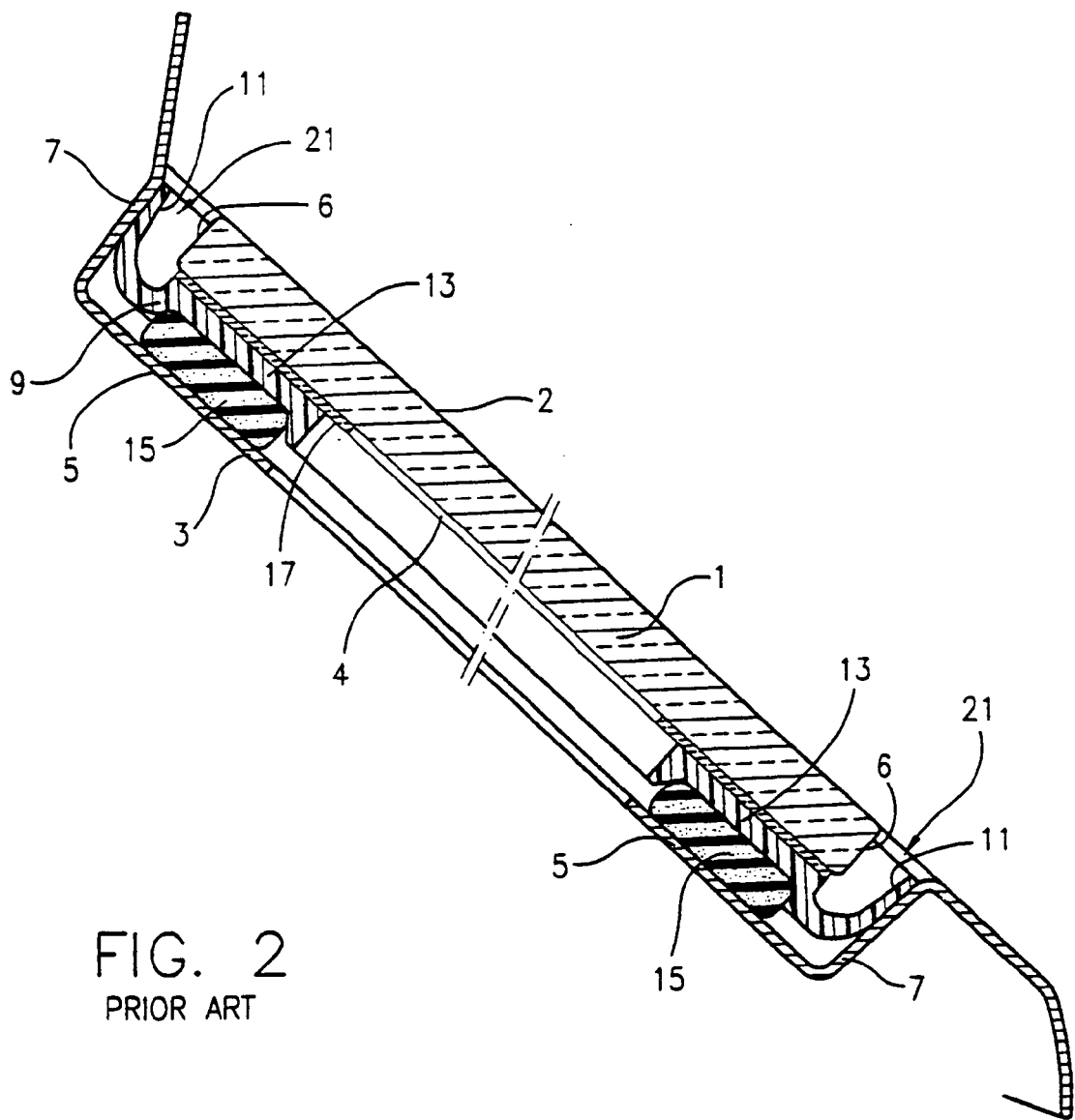
FIG. 2 is a cross sectional view of another prior art vehicle glazing assembly, including a frame profile.

Referring now more particularly to the accompanying drawings in which like reference numerals indicate like parts throughout the several views.

Figure 3:
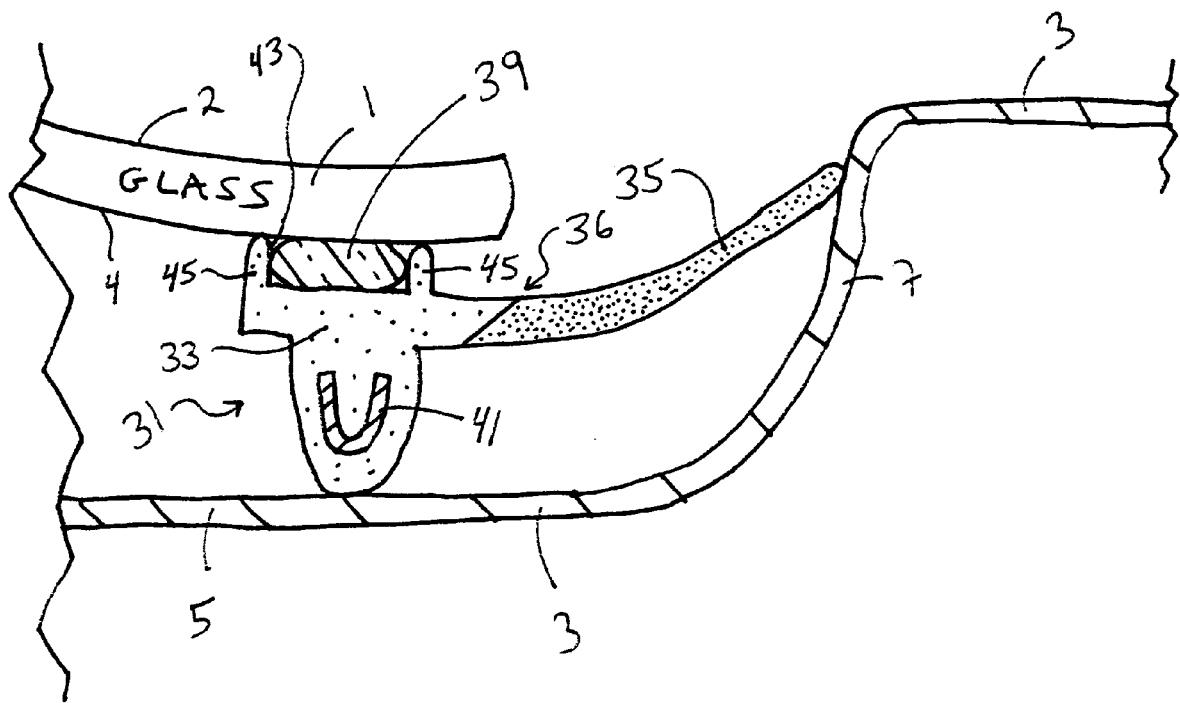
FIG. 3 is a cross sectional view of a vehicle glazing edge seal of frame profile according to an example embodiment of this invention.

FIG. 3 is a cross sectional view of glazing (e.g., glass substrate) 1 with polymer edge seal profile 31 thereon according to an example embodiment of this invention. FIG. 3 illustrates the combination of the glazing 1 and polymer frame profile 31 after the profile 31 has been bonded/attached to the glazing and the combination positioned in a vehicle window frame 3. The window frame 3 (e.g., of sheet metal) includes attachment flange 5 and frame section 7. Optionally, a dark or black baked enamel layer (not shown) and/or a primer layer (not shown) may be provided on the glazing between the interior surface 4 of the glazing and profile 31. Thus, herein profile 31 is considered "on" the glazing 1, "supported by" the glazing, "adhered to" the glazing, and "bonded to" the glazing even though additional layer(s) (e.g., primer layer(s), opaque layer(s), etc.) may be provided therebetween.

Glazing 1 is preferably a glass sheet (flat or bent) to be used as a window in a vehicle (e.g., side window, backlite, or windshield). Glazing/substrate 1 is illustrated monolithically (i.e., single sheet), but it will be appreciated by those skilled in the art that glazing 1 may instead be a laminate including multiple glass sheets/layers in certain embodiments of this invention. Exterior major surface 2 of the glazing 1 is exposed to the atmosphere outside the vehicle once the window unit has been installed, while interior major surface 4 of the glazing is exposed to the vehicle interior. Surfaces 2 and 4 of glazing 1 are approximately parallel (i.e., whether bent of flat) to one another in preferred embodiments of this invention.

Edge seal polymer profile 31 includes a main body portion 33 and an elongated flexible lip portion 35. The flexible lip portion 35 is attached to and extends outwardly from the main body portion 33 of the edge seal profile 31. The distal end of the flexible lip 35 typically contacts section 7 of the vehicle window frame 3 in order to create a substantial water seal of the like between the frame 3 and the edge of the glazing 1.

Stiffener 41 is embedded within the main body portion 33 of edge seal polymer profile 31. Stiffener 41 is typically formed of a material such as a metal like aluminum (Al) or the like. Stiffener 41 may be formed along with the main body portion 33 during a coextrusion process, or may be formed in any other suitable manner in different embodiments of this invention. Stiffener 41 is entirely embedded within the main body portion 33 of the polymer profile 31 when viewed cross sectionally in certain example embodiments of this invention (e.g., see FIG. 3), so that the stiffener is not exposed to atmosphere or the like along the majority of the window periphery. Aluminum stiffening member 41 allows the reveal of polymer profile 31 to be easily formed to an appropriate shape, yet is rigid enough to substantially maintain that formed shape while adhesive 39 sets and/or cures.

In certain example embodiments of this invention, stiffener 41 is substantially U-shaped and/or V-shaped, so that the apex of the U and/or V faces away from the glazing 1 as shown in FIG. 3. This shape is advantageous in that it permits the stiffener to conform to a desired shape of a portion of the main body portion 33 and helps reduce deformation of the main body portion 33 of the profile 31 during curing and/or setting of adhesive 39. Moreover, this substantial U and/or V shape for stiffener 41 is also advantageous in that it permits the stiffener to substantially maintain the profile 31 at a given thickness(es) thereby permitting it to provide good spacing characteristics between the glazing 1 and window frame 3 during vehicle operation and otherwise.

The profile 31 is provided with an adhesive retaining structure which includes cut-out portion or cavity 43 defined in the bottom surface of the profile adjacent the glazing 1. The cut-out or cavity 43 is defined and shaped so as to receive adhesive 39 therein, thereby locating the adhesive 39 in a substantially fixed area between the glazing 1 and main body 33 of the edge seal 31. This adhesive retaining structure, including cut-out or cavity 43, permits the adhesive 39 to be controlled within a substantially defined area, and to a defined thickness dictated by the length of legs 45 of the cut-out or cavity 43, thereby simplifying manufacture of the overall window structure of the vehicle. In certain example embodiments of this invention, the cut-out or cavity 43 is defined by legs 45 in combination with base portion 33 of the edge seal 31 so that the cut-out or cavity is substantially U-shaped. The adhesive 39 may then be positioned in the U of the cut-out or cavity (or recess), so that the adhesive does not significantly flow laterally during setting and/or curing thereof. Moreover, the ability of the cut-out or cavity 43 to maintain the adhesive 39 at a given thickness defined by the length of legs 45 is advantageous in that it permits the profile edge seal 31 to be more easily located at its most desired position on the glazing 1. It is noted that legs 45 may be straight or curved in different embodiments of this invention, depending upon the shape of the window and how many sides (e.g., one, two, three or all four) of the window the profile extends around. Moreover, in certain example embodiments of this invention, legs 45 are spaced apart from one another an approximately constant distances around the window, so as to be substantially parallel to one another.

In certain example embodiments of this invention, the ability of the adhesive retaining structure to maintain the adhesive 39 at a given thickness and substantially in a given area is also advantageous in that no additional adhesive tape is required for bonding the profile 31 to the glazing 1.

In certain example embodiments of this invention, a primer (not shown) is provided between the adhesive 39 and glazing 1. An example primer that may be used in this regard is Dow 435-55 primer, which is advantageous with respect to long term adhesive bonding performance of the profile 31 to glazing 1.

The aforesaid characteristics are highly advantageous in that they allow for, alone or in combination, ease of manufacturing, including in-line manufacturing of the assembled glass based units, in a more efficient and cost-effective manner.

The profile 31, including base portion 33 and lip portion 35, may be made of the same common material in certain example embodiments of this invention (e.g., urethane, PVC, or the like).

However, in certain embodiments of this invention as shown in FIG. 1, the base portion 33 and lip portion 35 are made of different materials. In certain example instances, base portion 33 is made of or includes a polymer based material such as PVC (polyvinyl chloride), whereas lip portion 35 is made of or includes a different polymer based material such as a thermoplastic elastomer (TPE). In certain example embodiments of this invention, the lip portion 35 is made of or includes a TPE such as Alcryn™ or Alcryn Melt Processible Rubber (MPR), made by Advanced Polymer Alloys, Wilmington, Del. This material for lip portion 35 can be made by extruding, injection molding, blow molding, or the like, and is especially useful for anti-squeaking properties in automotive applications. Alternatively, Santoprene™ may be used for lip portion 35 in other example embodiments of this invention.

When lip portion 35 is made of or includes a TPE based material such as Alcryn discussed above, the base portion 33 of the polymer profile 31 may be formed so as to be bonded thereto at junction or interface 36. The two materials may be joined by coextrusion, molding or in any other suitable manner. In this regard, base portion 33 of profile 31 may include or be of any suitable polymer material, including but not limited to polyurethane (PU) (one or multiple component), polyvinyl chloride (PVC), polypropylene (PP), thermoplastic rubber (TPR), thermoplastic urethane, thermoplastic olefin (TPO), and/or thermoplastic elastomer (TPE). Profiles 31 herein may be applied along only one or two side(s) of glazing/substrate 1 in certain embodiments (e.g., for a vehicle windshield), but in other embodiments may be applied around the entire circumference or edge (i.e., four sides) of the glazing (e.g., vehicle backlite or rear window embodiments).

Adhesive 39 may be of any suitable material, such as a moisture cured urethane, a two part urethane, and/or the like. Any other suitable type of adhesive may also be used.

The aforesaid combination of the adhesive retaining structure and metal inclusive stiffener are highly advantageous in combination, in that they permit the edge seal to be adhesively bonded to a single major surface of the glazing, and allow the reveal to substantially hold itself to shape until the adhesive has set and cured.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A vehicle window assembly comprising:
   a substrate or glazing having opposing interior and exterior major surfaces;
   a polymer inclusive profile adhered to only the interior surface of the substrate or glazing via at least an adhesive, the polymer inclusive profile including a polymer inclusive base portion and an elongated flexible lip portion which extends from the base portion in a manner so as to contact a vehicle window frame;
   the profile including each of: (a) a metal inclusive stiffener embedded in the polymer inclusive base portion of the profile so that the stiffener is surrounded on all sides by the polymer inclusive base portion when viewed cross-sectionally, and (b) an adhesive retaining cut-out or cavity defined in a bottom surface of the profile adjacent the interior surface of the substrate or glazing;
   wherein the metal inclusive stiffener has a shape when viewed in cross-section selected from the group consisting of substantially U-shaped and substantially V-shaped, and an opening of the substantially U-shaped cross-section or the substantially V-shaped cross-section faces towards the substrate or glazing; and
   wherein at least a substantial portion of the adhesive for adhering the profile to the interior surface of the substrate or glazing is provided in the adhesive retaining cut-out or cavity defined in the bottom surface of the profile.

2. The vehicle window assembly of claim 1, wherein the flexible lip portion of the profile comprises a thermoplastic elastomer, and the base portion of the profile comprises at least one of polyvinyl chloride and polypropylene.

3. The vehicle window assembly of claim 1, wherein the adhesive retaining cut-out or cavity is defined by first and second legs and the base portion of the profile, wherein the first and second legs extend from the base portion of the profile toward the glazing or substrate.

4. The vehicle window assembly of claim 1, wherein an apex of the stiffener points away from the glazing or substrate.

5. The vehicle window assembly of claim 1, wherein the glazing or substrate comprises a bent glass sheet that is thermally tempered.

6. The vehicle window assembly of claim 1, wherein a primer layer is provided between the glazing or substrate and the adhesive.

7. A polymer inclusive profile for use in a vehicle window assembly, the polymer inclusive profile comprising:
   polymer inclusive base portion;
   an elongated flexible lip portion which extends from the base portion in a manner suitable for contacting a vehicle window frame;
   a stiffener embedded in the polymer inclusive base portion of the profile so that the stiffener is surrounded on all sides by the polymer inclusive base portion when viewed cross-sectionally, the cross-section including an opening; and
   an adhesive retaining cavity defined in a bottom surface of the profile to be adjacent to substantially only an interior major surface of a window, wherein the opening faces the adhesive retaining cavity.

8. The profile of claim 7, wherein the flexible lip portion of the profile comprises a thermoplastic elastomer, and the base portion of the profile comprises at least one of polyvinyl chloride and polypropylene.

9. The profile of claim 7, wherein the adhesive retaining cavity is defined by first and second legs and the base portion of the profile, wherein the first and second legs extend from the base portion of the profile toward the substrate.

10. The profile of claim 7, wherein the stiffener has a shape when viewed in cross-section selected from the group consisting of substantially U-shaped and substantially V-shaped, and an apex of the stiffener points away from the window.

* * * * *